United States Patent

[11] 3,573,539

[72] Inventor John W. Lister
Syracuse, N.Y.
[21] Appl. No. 812,252
[22] Filed Apr. 1, 1969
[45] Patented Apr. 6, 1971
[73] Assignee General Electric Company

[54] ADJUSTABLE FOCUS VOLTAGE SUPPLY FOR TELEVISION RECEIVERS

8 Claims, 4 Drawing Figs.

[52] U.S. Cl. .......... 315/31
[51] Int. Cl. .......... H01j 29/56
[50] Field of Search .......... 315/31

[56] References Cited
UNITED STATES PATENTS
2,628,327 2/1953 Vilkomerson .......... 315/31

*Primary Examiner*—Rodney D. Bennett, Jr.
*Assistant Examiner*—Joseph G. Baxter
*Attorneys*—Francis H. Boos, Jr., Frank L. Neuhauser, Oscar B. Waddell, Joseph B. Forman and James E. Espe

ABSTRACT: An improved adjustable focus voltage supply for television receivers comprising a variable differential capacitor having at least two fixed plates and a movable plate. The fixed plates are coupled across a portion of the primary winding of the horizontal flyback transformer of the receiver. A diode rectifier has one terminal connected to the movable plate of the differential capacitor and a remaining terminal connected to a point on the winding which, during operation, normally generates pulses of greater amplitude than the points to which the fixed plates of the differential capacitor are connected. An output terminal for deriving the desired variably controlled DC focus voltage is connected to the juncture of the diode rectifier and the movable plate of the differential capacitor. The fixed plates of the differential capacitor are connected to spaced points on the primary winding and, in the illustrated embodiment, the connections straddle the point on the winding which is maintained at alternating current ground reference potential during normal operation. Additionally, the output terminal is connected through a load resistor to a source of alternating current ground reference potential.

INVENTOR:
JOHN W. LISTER,
BY Francis H. Boss, Jr.
HIS ATTORNEY.

ADJUSTABLE FOCUS VOLTAGE SUPPLY FOR TELEVISION RECEIVERS

BACKGROUND OF INVENTION

1. Field of Invention

This invention relates to a new and improved, adjustably controlled focus voltage supply particularly useful in color television receivers. More precisely, the invention relates to the use of a differential capacitor in the focus supply circuit as both a charge storing device and as a variable DC focus potential controlling device.

2. Statement of Prior Art

Many color television receiver picture tubes require a variably controlled, focus voltage during operation in order to provide good, clear and well defined (sharp) color image reproduction. This focus voltage is supplied to a focusing electrode of the color television picture tube which requires very little focus current (on the order of −45 to +15 microamperes) but which does require a relatively high focusing potential in the neighborhood of 16 percent to 21 percent of the anode voltage of the tube. Since the color television picture tube anode voltage is on the order of 25 kilovolts, the provision of a suitable, variably controlled focus voltage supply at relatively low cost presents a problem.

While it is possible to obtain the desired, variably controlled, focus voltage directly from the color television picture tube anode voltage supply by means of a resistive voltage divider, such a divider would be quite large and expensive in order to be reliable due to the high voltage (25 kv.) required to be divided down. Because of the foregoing circumstances, most color television receiver set manufactures generate the desired focus voltage by means of a separate rectifier from the voltage pulses appearing at the horizontal flyback transformer. The value of the focus voltage thus derived then can be adjusted by varying the amplitude of the voltage pulses being rectified. The present invention provides such a separate rectifier, focus voltage supply for deriving a variably controlled DC potential from the horizontal flyback transformer.

SUMMARY OF INVENTION

It is therefore a primary object of this invention to provide a new and improved, adjustably controlled, focus voltage supply for television receivers.

A further object of the invention is to provide a reliable and relatively low-cost, adjustable focus voltage supply for color television receivers and which employs a differential capacitor that is used as both a charge storing device and as a variable DC focus potential controlling device.

In practicing the invention, the improved, adjustable focus voltage supply comprises a variable differential capacitor having at least two fixed plates and a movable plate. The fixed plates are coupled across a portion of the primary winding of the horizontal flyback transformer of a television receiver. A diode rectifier has one terminal (the cathode) connected to the movable plate of the differential capacitor and has its remaining terminal (the anode) connected to a point on the winding which, during operation, normally generates pulses of greater amplitude than the points to which the fixed plates of the differential capacitor are connected. Output terminal means for deriving the desired adjustable focus voltage is connected to the juncture of the diode rectifier and the movable plate of the differential capacitor whereby the value of the adjustable DC focus voltage derived from the output terminal can be variably controlled by the movable plate of the differential capacitor.

In one form of the invention, the points on the primary winding to which the fixed plates of the differential capacitor are connected straddle the point on the winding which is maintained at alternating current ground reference potential during normal operation. Additionally, it is desirable that a grounding resistor be connected between the juncture of the diode rectifier and the movable plate of the differential capacitor on one side and the source of alternating current ground reference potential on the other.

BRIEF DESCRIPTION OF DRAWINGS

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein.

DETAILED DESCRIPTION OF PREFERRED EMBODIMENT

Figure 1:
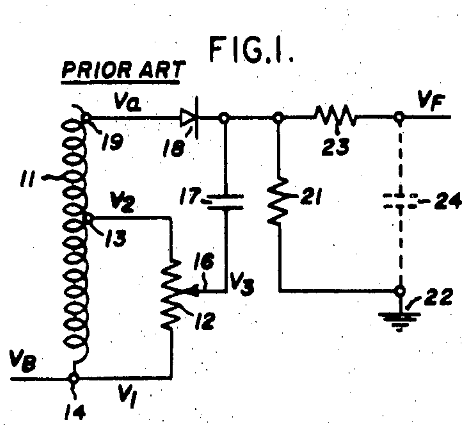
FIG. 1 is a schematic circuit diagram of a prior art focus voltage supply circuit utilizing a rectifier coupled to a high voltage winding through a variable resistor and separate charging capacitor.

FIG. 1 is a schematic circuit diagram of one known focus voltage supply circuit presently available in the art. In the supply circuit shown in FIG. 1, a winding that comprises the primary of the horizontal flyback transformer of a color television receiving set is shown at 11. A potentiometer 12 is connected across a portion of the winding 11 at points 13 and 14. Point 15 is at alternating ground reference potential, and is sometimes termed the boost point of the winding 11. The variable tap 16 of potentiometer 12 is connected to a charging capacitor 17 that, for example, has a capacitance of about 120 picofarads and operates at about 6 kilovolts. The capacitor 17 has its remaining electrode or plate connected to the cathode terminal of a diode rectifier 18 whose anode is connected to point 19 on the high voltage winding 11. During operation of the circuit, the flyback pulse appearing at point 19 is normally at a higher amplitude than the amplitude of the pulse appearing at point 13. If the boost point were intermediate points 13 and 14, then the pulse amplitude at point 19 would be higher than the pulse amplitudes (positive and negative) of either of points 13 or 14.

A load resistor 21 is connected between the juncture of the diode 18 and charging capacitor 17 and alternating current ground potential shown at 22. The output direct current potential developed across the load resistor 21, is filtered by a filter resistor 23 and the stray capacitance shown at 24 of the lead that connects the DC focus supply voltage to the focus electrode of the color television picture tube (not shown).

During operation of the circuit, the high voltage pulses appearing across high voltage winding 11 are rectified by diode rectifier 18 and result in charging the charging capacitor 17 to an essentially steady state level determined by the difference in pulse amplitude $V_a$ at point 19 and the pulse amplitude $V_3$ at the variable tap 16 of the potentiometer 12. By varying the tap 16, the value of the DC potential appearing across charging capacitor 17 can be controlled. This variable or adjustable value DC potential $V_F$ is then supplied through the filter resistor 23 and its associated lead stray capacitance 24 to the focus electrode of the color television picture tube.

Figure 2:
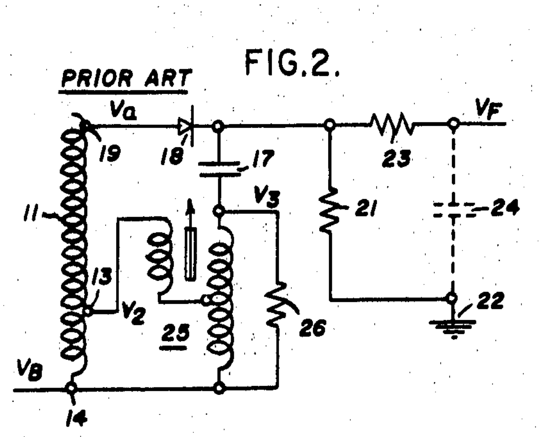
FIG. 2 is a schematic circuit diagram of still another form of known focus voltage supply circuit utilizing a variable transformer and separate charging capacitor coupled across a high voltage winding through a diode rectifier.

The prior art focus voltage supply circuit shown in FIG. 2 is quite similar to the circuit of FIG. 1 with the exception that a variable transformer 25 is used in place of the potentiometer 12 and a damping resistor 26 is connected across the secondary winding of the variable transformer 25. With this arrangement, control of the value of the DC focus voltage supplied at the output terminals of the circuit is controlled by adjusting the degree of coupling between the input and output windings of the variable transformer 25. In all other respects, the construction and operation of the circuit shown in FIG. 2 is similar to that shown in FIG. 1.

Figure 3:
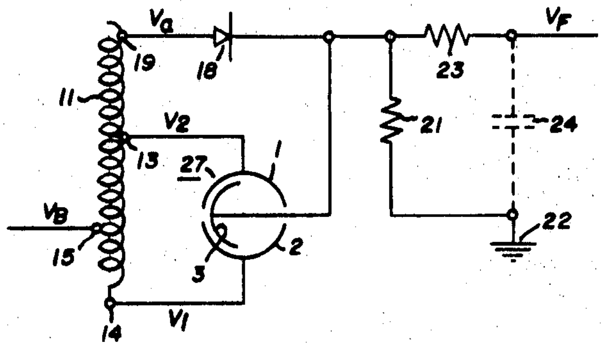
FIG. 3 is a schematic circuit diagram of a new and improved, adjustable value, focus voltage supply circuit constructed in accordance with the invention.

FIG. 3 is a schematic circuit diagram of a new and improved, adjustable value, DC focus voltage supply circuit constructed in accordance with the invention. The supply circuit shown in FIG. 3 is similar in many respects to the prior art circuits shown in FIGS. 1 and 2 with the exception of the use of a differential capacitor 27 that serves as both a charge storing device and a voltage controlling device. Differential capacitor 27 has two fixed plates 1 and 2 which are connected to points 13 and 14 of high voltage winding 11 so as to straddle the boost point 15 which is maintained at alternating current ground potential. If desired, the points 13 and 14 may be so located that the potential at these two points is equal in magnitude but opposite in polarity. Alternatively they may be connected so that either points 13 or 14 coincide with boost point 15 (as shown in FIG. 1 for point 14). The choice will be determined by the specific application under consideration. The differential capacitor 27 further includes a movable plate 3 that can be rotated so as to be disposed opposite either the fixed plate 1 or the fixed plate 2, or at some intermediate position so that the sum of the capacitance $C_{13}$ and $C_{23}$ (where $C_{13}$ is the capacitance between the plates 1 and 3 and $C_{23}$ remain essentially constant. Hence, when the capacitance $C_{13}$ is at its maximum value, the capacitance $c_{23}$ is at its minimum value, and vice versa. The variable differential capacitor 27 has its movable plate 3 connected directly to the cathode of the diode rectifier 18.

During operation, the novel focus voltage supply circuit shown in FIG. 3 functions in the following manner: For the purposes of this analysis, it is assumed that the diode rectifier 18 is a perfect diode, (i.e. $z_f=0$ and $z_b=\infty$ where $z_f$ is the forward impedance of the diode, and $z_b$ is the back or blocking impedance of the diode). It is also assumed that $R_L$, the load resistor 21, has a resistance value of about 70 megohms and that the capacitance $C$ has a value of 100 micromicrofarads, where $C=C_{13}+C_{23}$. It is also assumed that the high voltage pulses appearing across the horizontal flyback transformer winding 11 occur at a horizontal frequency having a period $T_H$ of 63.5 microseconds. These flyback pulses will be occurring at the horizontal rate and appear in differing amplitudes at all points along the high voltage winding 11 except at the boost connection point 15 which is at alternating current ground reference potential with respect to the flyback pulses. As a consequence of this arrangement, the time constant $CR_L$ is long compared with the horizontal period $T_H$ so that $CR_L=7$ msec. $> 100\ T_H$. $V_a$, $V_1$ and $V_2$ are the flyback pulse voltage amplitudes measured with respect to the boost voltage at point 15 (alternating current ground reference potential).

As stated above, $C=C_{13}+C_{23}$. From this relationship, it can be determined that $$C_{12}=K+\frac{C_{13}C_{23}}{C_{13}+C_{23}} \qquad (1)$$

From equation (1), it can be determined that $\Delta c_{12}$ max = approximately 0.25 $C$ where $\Delta C_{12}$ represents the change in capacitance of $C_{12}$ as $C_{13}$ is varied from 0 to $C$. By neglecting the effect of $\Delta C_{12}$ on $V_1$, $V_2$, and $V_a$, the equivalent circuit shown in FIG. 4 can be drawn.

Figure 4:
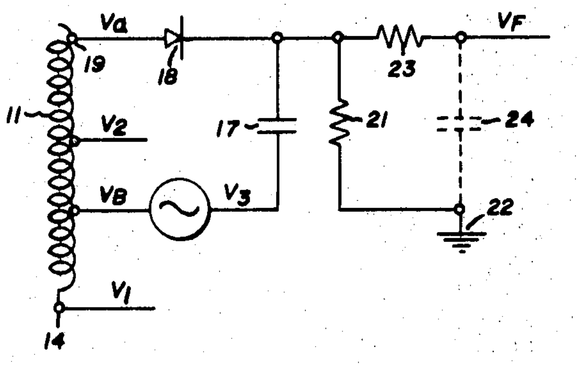
FIG. 4 is an equivalent circuit diagram of the novel focus voltage supply circuit shown in FIG. 3.

From an examination of the equivalent circuit shown in FIG. 4, it can be demonstrated that $$V_3=\frac{V_1C_{13}+V_2C_{23}}{C} \qquad (2)$$

From a consideration of equation (2), it will be seen that as $C_{23}$ is varied from 0 to $C$, $V_3$ changes from $V_1$ to $V_2$. During the flyback interval, $C$ is charged through the diode rectifier 18 to a direct current potential equal to $(V_a-V_3)_{p-p}$, which is the peak to peak voltage difference between $V_a$ and $V_3$. The output voltage appearing at the cathode of diode rectifier 18 is given by the following expression:

$$V_F=V_{boost}+(V_a-V_3)_{p1p} \qquad (3)$$

The alternating current component $V_3$ is filtered out by the filter resistor 23 and the stray capacitance 24 of the lead supplying the focus voltage to the focus electrode terminal of the television picture tube. Hence, $V_F$ will equal approximately $V_{boost}+V_a-V3)_{p1p}$ and the change in $V_F$ by varying the differential capacitor is given by $\Delta V3=V_1-V$.

From a consideration of the above-set-forth expressions, it will be appreciated that the novel focus voltage supply circuit made available by the invention provides smooth control of output voltage over a well defined range and is made possible by the fact that the differential capacitor serves as both a charge storing device and as a DC potential controlling device.

From a comparison of FIGS. 1 and 2 to the novel focus voltage supply circuit shown in FIG. 3, it will be appreciated that either a potentiometer and a capacitor (in the case of the circuit shown in FIG. 1), or a variable transformer, a resistor and a capacitor (in the case of the FIG. 2 circuit), are replaced by the signal differential capacitor employed in the focus voltage supply circuit comprising the invention. Thus, it will be appreciated that not only does the circuit provide a smoothly adjustable DC potential that can be used as a focus voltage, but that it can be built at lower cost than comparable circuits for performing the same function.

The supply circuit shown in FIG. 3 has been built and tested successfully using a handmade 120 picofarad differential capacitor; and a conventional, commercially available selenium diode of the type normally used in the power supplies of residential color television sets. Because the capacitance of the diode rectifier may tend to lower the output voltage obtained somewhat, the value C of the differential capacitor should be at least 100 picofarads. By this means, changes in the value of the focus voltage due to changes in the capacitance of the diode rectifier can be reduced to acceptable levels. In operation, the circuit performs as described above to provide smooth control over the focus voltage range.

From the foregoing description, it will be appreciated that the invention provides a new and improved, adjustably controlled, focus voltage supply for color television picture tubes, and which employs a differential capacitor that is used as both a charge controlling device and as a variable DC focus potential controlling device.

Having described one embodiment of a new and improved, adjustable value, focus voltage supply circuit for color television picture tubes constructed in accordance with the invention, it is believed obvious that other modifications and variations of the invention are possible in the light of the above teachings. It is therefore to be understood that changes may be made in the particular embodiments of the invention described which are within the full and intended scope of the invention as defined by the appended claims.

I claim:

1. An improved adjustable focus voltage supply for television receivers comprising:

a variable differential capacitor having at least two fixed plates and a movable plate, said fixed plates being coupled across a portion of a primary winding of a horizontal flyback transformer of the receiver;

a rectifier having one terminal connected to the movable plate of the differential capacitor and its remaining terminal connected to a point on the primary winding at which, during operation, appear pulses of higher amplitude than appear at the points to which the fixed plates of the differential capacitor are connected; and output terminal means for deriving an adjustable value focus voltage from the juncture of the diode rectifier and the movable plate of the differential capacitor, the value of the adjustable focus voltage thus derived being variably controlled by the movable plate of the differential capacitor.

2. An adjustable focus voltage supply according to claim 1 wherein the output terminal means includes a load resistor connected intermediate the juncture of the rectifier and the movable plate of the differential capacitor and a source of alternating current ground reference potential.

3. An adjustable focus voltage supply according to claim 1 wherein the points on the high voltage winding to which the fixed plates of the differential capacitor are connected straddle a point on the primary winding which is maintained at alternating current ground reference potential during normal operation.

4. An adjustable focus voltage supply according to claim 3 wherein the rectifier is a diode rectifier and wherein the output terminal means includes a load resistor connected intermediate the juncture of the diode rectifier and the movable plate of the differential capacitor and a source of alternating current ground reference potential.

5. An adjustable focus voltage supply according to claim 4 wherein the diode rectifier has its cathode terminal connected to the movable plate of the differential capacitor and has its anode terminal connected to said higher pulse amplitude point on the primary winding.

6. An adjustable focus voltage supply according to claim 4 wherein the output terminal means further includes a filter resistor connected intermediate the juncture of the variable capacitor and one terminal of the diode rectifier and an output terminal from which the adjustable focus voltage is derived.

7. An adjustable focus voltage supply according to claim 6 wherein the diode rectifier has its cathode terminal connected to the movable plate of the differential capacitor and has its anode terminal connected to said higher pulse amplitude point on the primary winding.

8. An adjustable focus voltage supply according to claim 7 wherein the fixed plates of the differential capacitor are connected to spaced points on the primary winding straddling, by equal amounts, a point on the primary winding which is maintained at alternating current ground potential so that pulses of equal amplitude but opposite polarity occur at said fixed plates.